US012785776B2

(12) United States Patent
Elshafie et al.

(10) Patent No.: US 12,785,776 B2
(45) Date of Patent: Nov. 3, 2026

(54) ARTIFICIAL NOISE INJECTION IN CONNECTION WITH CHANNEL STATE INFORMATION REPORTING

(71) Applicant: QUALCOMM Incorporated, San Diego, CA (US)

(72) Inventors: Ahmed Elshafie, San Diego, CA (US); Alexandros Manolakos, Athens (GR); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 18/852,006

(22) PCT Filed: May 8, 2023

(86) PCT No.: PCT/US2023/021361

§ 371 (c)(1),
(2) Date: Sep. 27, 2024

(87) PCT Pub. No.: WO2023/224826

PCT Pub. Date: Nov. 23, 2023

(65) Prior Publication Data

US 2025/0286597 A1 Sep. 11, 2025

(30) Foreign Application Priority Data

May 16, 2022 (GR) ................................ 0220100398

(51) Int. Cl.
*H04B 17/309* (2015.01)
*H04B 7/06* (2006.01)

(52) U.S. Cl.
CPC ......... *H04B 7/063* (2013.01); *H04B 7/06952* (2023.05)

(58) Field of Classification Search
CPC .. H04B 7/0617; H04B 7/0456; H04B 17/318; H04B 7/0413; H04B 3/23; H04B 3/487; H04B 7/04013; H04B 7/0626; H04B 7/0426; H04B 17/309; H04B 3/234; H04B 7/086; H04B 1/1027; H04K 1/02; H04K 3/825; H04K 1/00; H04K 1/10;
(Continued)

(56) References Cited

U.S. PATENT DOCUMENTS 11,570,026 B2 * 1/2023 Shirakawa ............ H04L 5/0048
11,582,029 B2 * 2/2023 Sandell ............... H04W 12/037
(Continued)

OTHER PUBLICATIONS

International Search Report and Written Opinion—PCT/US2023/021361—ISA/EPO—Aug. 11, 2023.
(Continued)

*Primary Examiner* — Eva Y Puente
(74) *Attorney, Agent, or Firm* — Harrity & Harrity, LLP

(57) ABSTRACT

Various aspects of the present disclosure generally relate to wireless communication. In some aspects, a network node may receive an unprecoded reference signal. The network node may report, based on the unprecoded reference signal, beam information associated with artificial noise (AN). The network node may receive one or more data signals protected by one or more precoded AN signals, wherein the one or more precoded AN signals are based on the beam information. Numerous other aspects are described.

30 Claims, 12 Drawing Sheets

(58) Field of Classification Search
CPC .. H04K 3/43; H04K 2203/32; H04K 2203/34; H04K 3/65; H04K 2203/16; H04W 12/03; H04W 12/02; H04W 12/122; H04W 24/02; H04W 72/0473; H04W 52/243; H04W 52/40; H04W 72/0453; H04W 24/10; H04W 52/267; H04W 72/541; H04W 12/041; H04W 24/06
See application file for complete search history.

(56) References Cited

U.S. PATENT DOCUMENTS

| | | | | |
|---|---|---|---|---|
| 2015/0009836 | A1* | 1/2015 | Tujkovic | H04L 1/0026 370/252 |
| 2018/0269952 | A1* | 9/2018 | Nilsson | H04B 7/0617 |
| 2022/0158825 | A1* | 5/2022 | Sandell | H04L 9/0861 |
| 2023/0037324 | A1* | 2/2023 | Elshafie | H04W 52/243 |
| 2023/0050799 | A1* | 2/2023 | Yang | H04B 7/0695 |
| 2023/0198592 | A1* | 6/2023 | Yapici | H04L 1/08 370/252 |
| 2024/0340990 | A1* | 10/2024 | Bai | H04L 5/0051 |
| 2024/0349040 | A1* | 10/2024 | Elshafie | H04W 12/12 |
| 2025/0103708 | A1* | 3/2025 | Jin | G06F 21/554 |

OTHER PUBLICATIONS

Wu C-Y., et al., "Practical Physical Layer Security Schemes for MIMO-OFDM Systems Using Precoding Matrix Indices", IEEE Journal on Selected Areas in Communications, IEEE Service Center, Piscataway, US, vol. 31, No. 9, Sep. 1, 2013 (Sep. 1, 2013), pp. 1687-1700, XP011524968, ISSN: 0733-8716, DOI: 10.1109/JSAC.2013.130904 [retrieved on Aug. 22, 2013], p. 1687-1693, Figures 1-5.

* cited by examiner

ARTIFICIAL NOISE INJECTION IN CONNECTION WITH CHANNEL STATE INFORMATION REPORTING

CROSS-REFERENCE TO RELATED APPLICATIONS

This Patent Application is a 371 National Phase of PCT Application No. PCT/US2023/021361, filed May 8, 2023, entitled "ARTIFICIAL NOISE INJECTION IN CONNECTION WITH CHANNEL STATE INFORMATION REPORTING," and claims priority to Greek patent application No. 20220100398, filed on May 16, 2022, entitled "ARTIFICIAL NOISE INJECTION IN CONNECTION WITH CHANNEL STATE INFORMATION REPORTING," and assigned to the assignee hereof. The disclosure of the prior Applications are considered part of and are incorporated by reference into this Patent Application.

INTRODUCTION

Aspects of the present disclosure generally relate to wireless communication and to techniques and apparatuses for artificial noise injection in connection with channel state information reporting.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a network node for wireless communication. The network node may include a memory and one or more processors coupled to the memory. The one or more processors may be configured to receive an unprecoded reference signal. The one or more processors may be configured to report, based on the unprecoded reference signal, beam information associated with artificial noise (AN). The one or more processors may be configured to receive one or more data signals protected by one or more precoded AN signals, wherein the one or more precoded AN signals are based on the beam information.

Some aspects described herein relate to a network node for wireless communication. The network node may include a memory and one or more processors coupled to the memory. The one or more processors may be configured to transmit an unprecoded reference signal. The one or more processors may be configured to receive, based on transmitting the unprecoded reference signal, a report of beam information associated with AN. The one or more processors may be configured to transmit one or more data signals protected by one or more precoded AN signals, wherein the one or more precoded AN signals are based on the beam information.

Some aspects described herein relate to a method of wireless communication performed by a network node. The method may include receiving an unprecoded reference signal. The method may include reporting, based on the unprecoded reference signal, beam information associated with AN. The method may include receiving one or more data signals protected by one or more precoded AN signals, wherein the one or more precoded AN signals are based on the beam information.

Some aspects described herein relate to a method of wireless communication performed by a network node. The method may include transmitting an unprecoded reference signal. The method may include receiving, based on transmitting the unprecoded reference signal, a report of beam information associated with AN. The method may include transmitting one or more data signals protected by one or more precoded AN signals, wherein the one or more precoded AN signals are based on the beam information.

Some aspects described herein relate to a non-transitory computer-readable medium that stores a set of instructions for wireless communication by a network node. The set of instructions, when executed by one or more processors of the network node, may cause the network node to receive an unprecoded reference signal. The set of instructions, when executed by one or more processors of the network node, may cause the network node to report, based on the unprecoded reference signal, beam information associated with AN. The set of instructions, when executed by one or more processors of the network node, may cause the network node to receive one or more data signals protected by one or more precoded AN signals, wherein the one or more precoded AN signals are based on the beam information.

Some aspects described herein relate to a non-transitory computer-readable medium that stores a set of instructions for wireless communication by a network node. The set of instructions, when executed by one or more processors of the network node, may cause the network node to transmit an unprecoded reference signal. The set of instructions, when executed by one or more processors of the network node, may cause the network node to receive, based on transmitting the unprecoded reference signal, a report of beam information associated with AN. The set of instructions, when executed by one or more processors of the network node, may cause the network node to transmit one or more data signals protected by one or more precoded AN signals, wherein the one or more precoded AN signals are based on the beam information.

Some aspects described herein relate to an apparatus for wireless communication. The apparatus may include means for receiving an unprecoded reference signal. The apparatus may include means for reporting, based on the unprecoded reference signal, beam information associated with AN. The apparatus may include means for receiving one or more data signals protected by one or more precoded AN signals, wherein the one or more precoded AN signals are based on the beam information.

Some aspects described herein relate to an apparatus for wireless communication. The apparatus may include means for transmitting an unprecoded reference signal. The apparatus may include means for receiving, based on transmitting the unprecoded reference signal, a report of beam information associated with AN. The apparatus may include means for transmitting one or more data signals protected by one or more precoded AN signals, wherein the one or more precoded AN signals are based on the beam information.

Aspects generally include a method, apparatus, system, computer program product, non-transitory computer-readable medium, user equipment, base station, network entity, node, network node, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
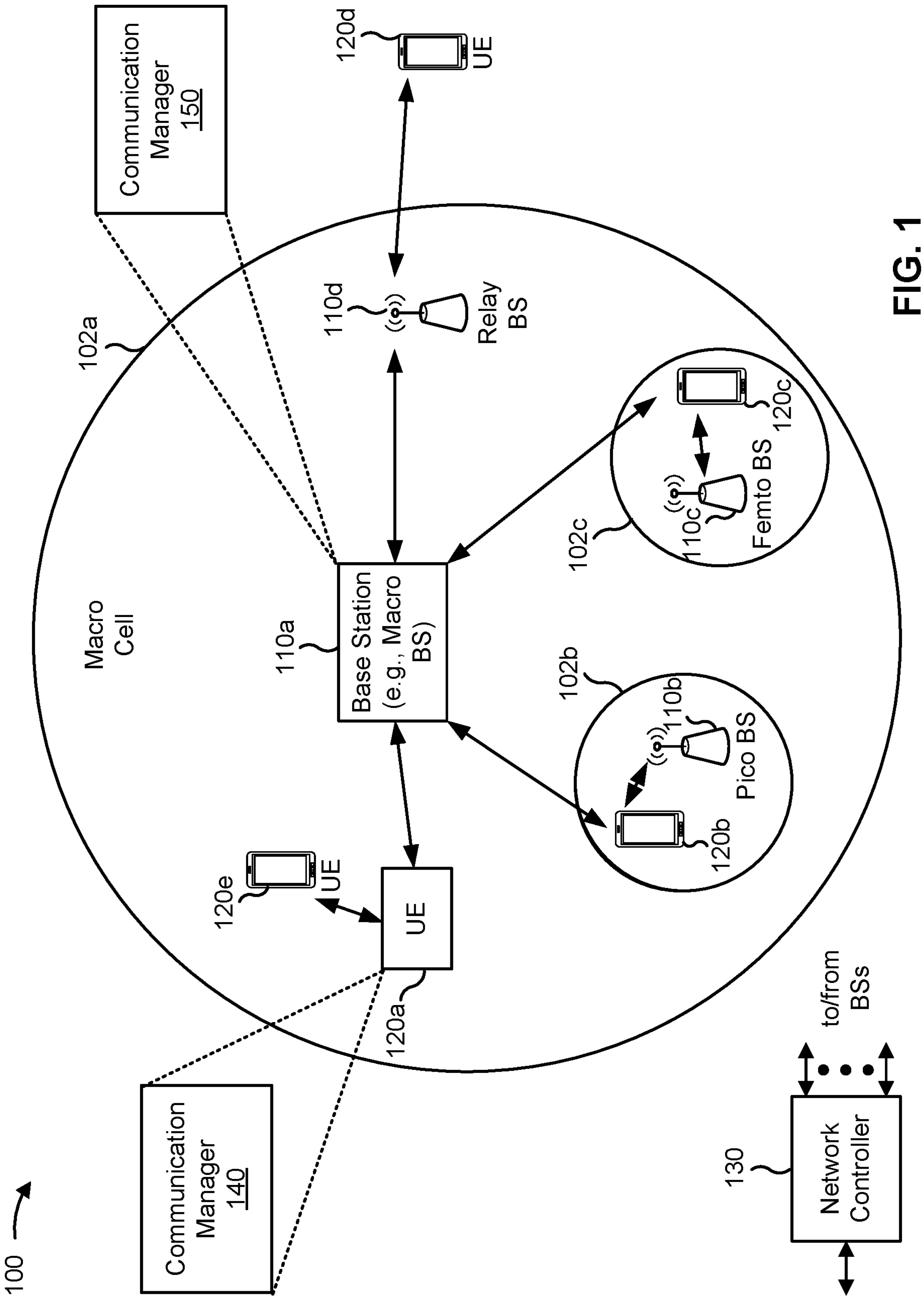
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

As described in more detail herein, deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity," "network node," or "node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an unprecoded reference signal; report, based on the unprecoded reference signal, beam information associated with artificial noise (AN); and receive one or more data signals protected by one or more precoded AN signals, wherein the one or more precoded AN signals are based on the beam information. Additionally, or alternatively, the communication manager 140 may perform one or more other operations described herein.

In some aspects, the base station 110 may include a communication manager 150. As described in more detail elsewhere herein, the communication manager 150 may transmit an unprecoded reference signal; receive, based on transmitting the unprecoded reference signal, a report of beam information associated with AN; and transmit one or more data signals protected by one or more precoded AN signals, wherein the one or more precoded AN signals are based on the beam information. Additionally, or alternatively, the communication manager 150 may perform one or more other operations described herein.

As indicated above, FIG. 1 is provided as an example. Other examples may differ from what is described with regard to FIG. 1.

Figure 2:
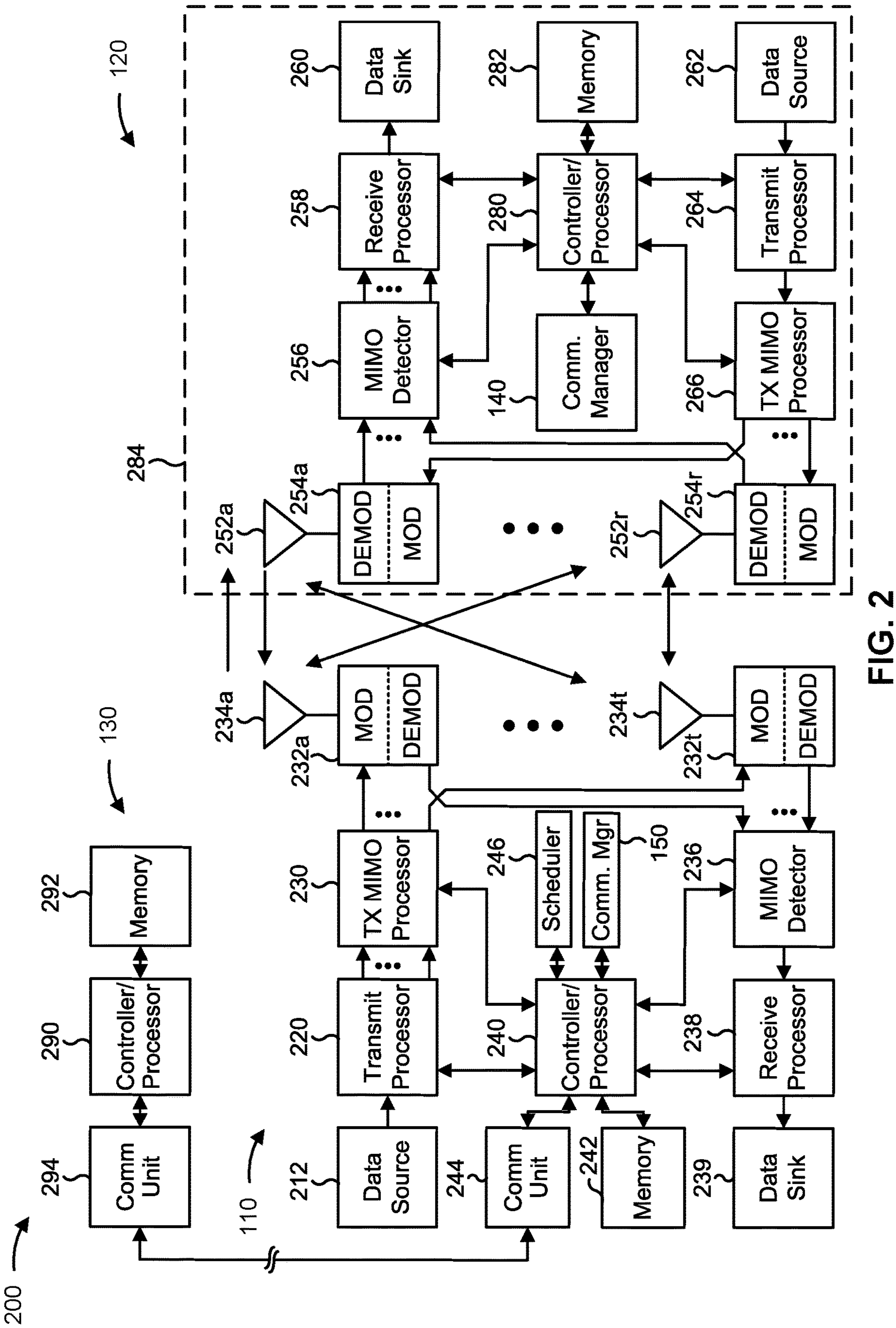
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based on one or more channel quality indicators (CQIs) received from that UE 120. The base station 110 may process (e.g., encode and modulate) the data for the UE 120 based on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with artificial noise injection in connection with channel state information reporting, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving an unprecoded reference signal; means for reporting, based on the unprecoded reference signal, beam information associated with AN; and/or means for receiving one or more data signals protected by one or more precoded AN signals, wherein the one or more precoded AN signals are based on the beam information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting an unprecoded reference signal; means for receiving, based on transmitting the unprecoded reference signal, a report of beam information associated with AN; and/or means for transmitting one or more data signals protected by one or more precoded AN signals, wherein the one or more precoded AN signals are based on the beam information. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
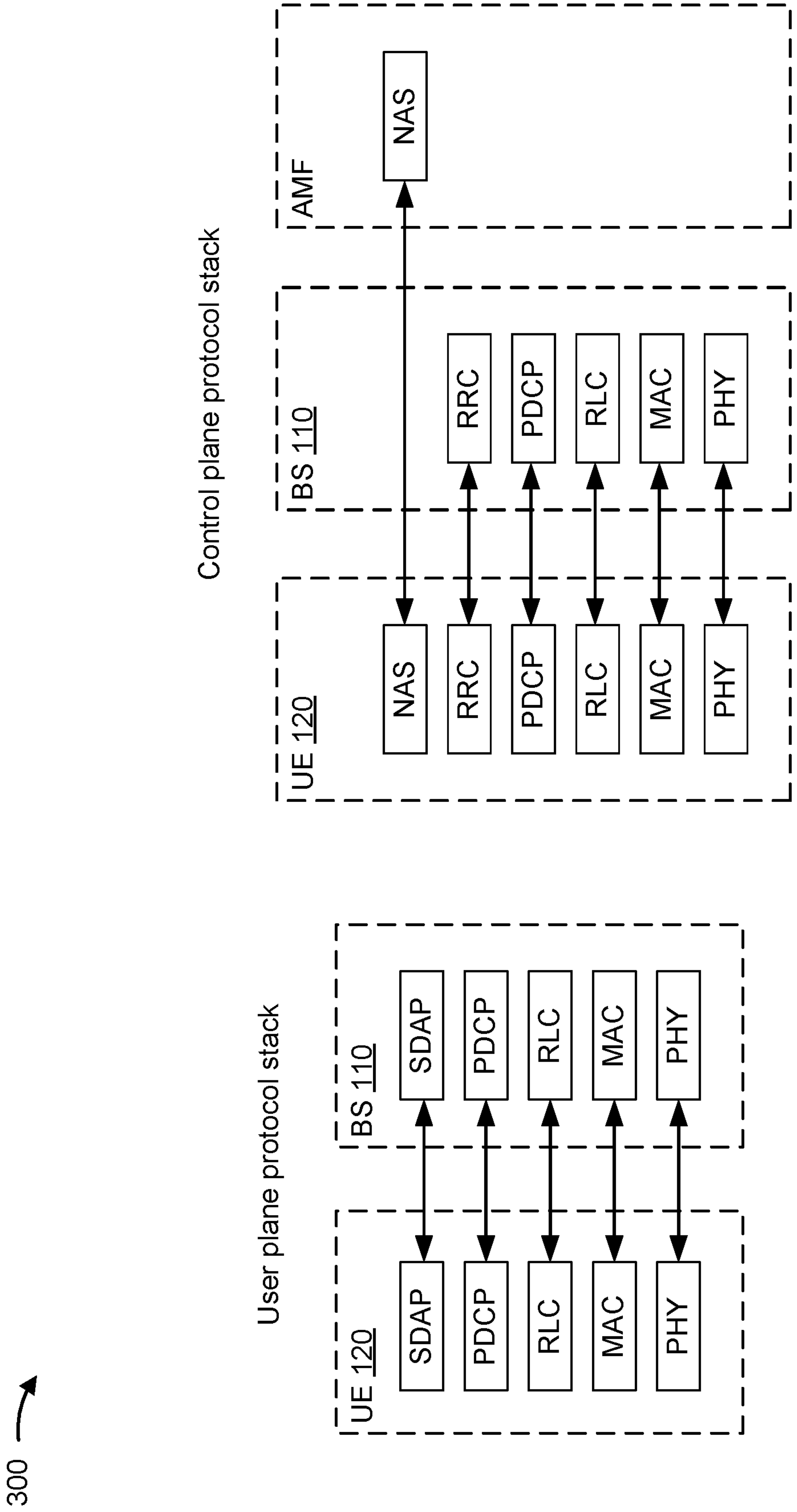
FIG. 3 is a diagram illustrating an example of a user plane protocol stack and a control plane protocol stack for a base station and a core network in communication with a UE, in accordance with the present disclosure.

FIG. 3 is a diagram illustrating an example 300 of a user plane protocol stack and a control plane protocol stack for a base station 110 and a core network in communication with a UE 120, in accordance with the present disclosure.

On the user plane, the UE 120 and the base station 110 may include respective physical (PHY) layers, medium access control (MAC) layers, radio link control (RLC) layers, packet data convergence protocol (PDCP) layers, and service data adaptation protocol (SDAP) layers. A user plane function may handle transport of user data between the UE 120 and the base station 110. On the control plane, the UE 120 and the base station 110 may include respective radio resource control (RRC) layers. Furthermore, the UE 120 may include a non-access stratum (NAS) layer in communication with an NAS layer of an access and management mobility function (AMF). The AMF may be associated with a core network associated with the base station 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 3, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3). In some wireless systems, information is encrypted at L3 and information generated below L3 is not encrypted.

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the base station 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1). To encrypt information at L1, a UE 120 or base station 110 may use a secret key generated based on a key provided to the PHY layer from an upper layer and/or based on one or more PHY layer parameters. Using the one or more PHY layer parameters may provide some randomness between the transmitter and the receiver. Alternatively, another source of randomness may be used in connection with transmitted information. Using randomness may reduce an effectiveness of attempts to intercept communications by an intercepting (e.g., eavesdropping) or malicious communication device On the receiving side (e.g., if the UE 120 is receiving a downlink communication or the base station 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As indicated above, FIG. 3 is provided as an example. Other examples may differ from what is described with regard to FIG. 3.

Figure 4:
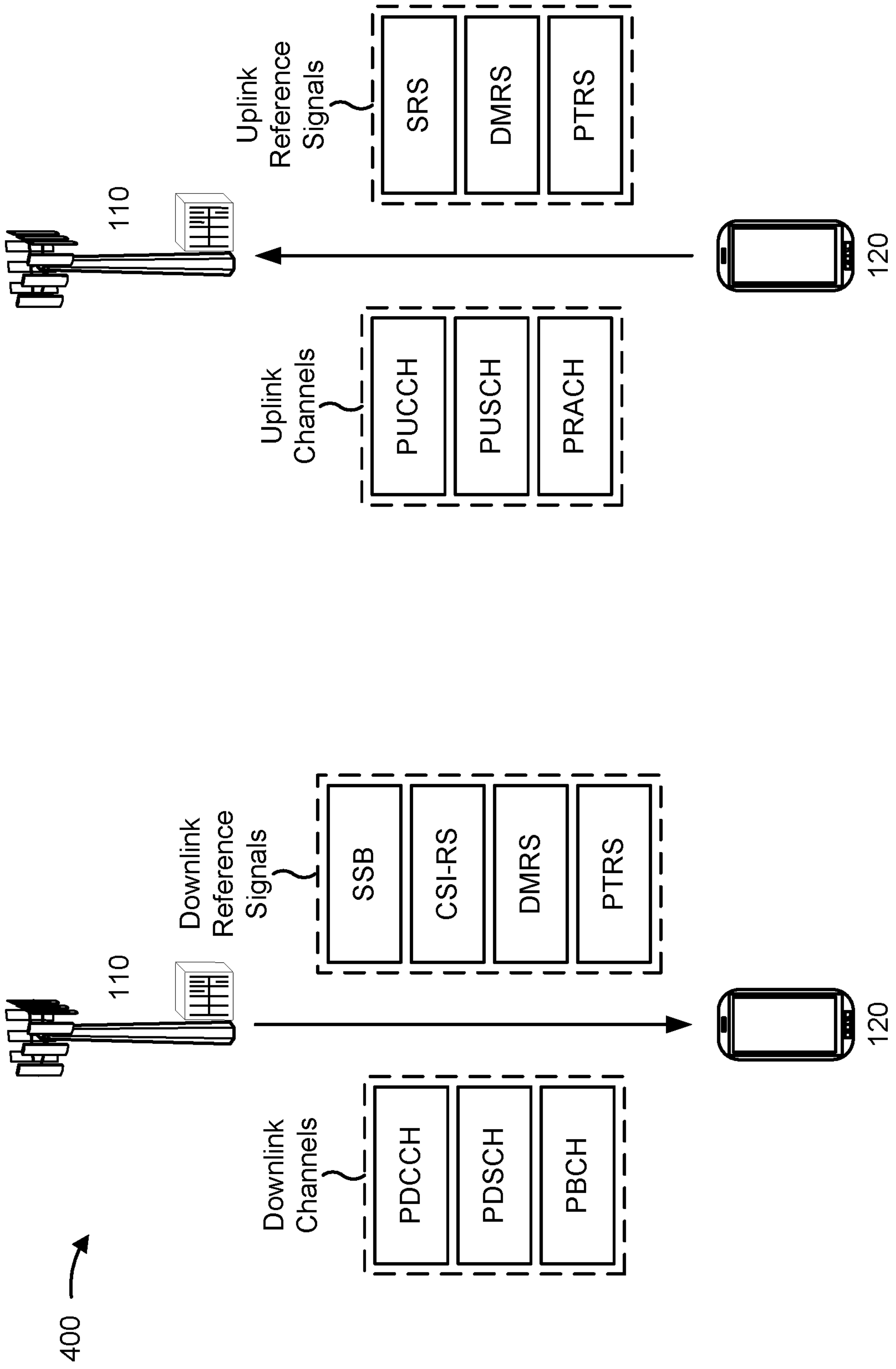
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. The UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, artificial noise injection, or beam management, among other examples. The base station 110 may configure a set of CSI-RSs for the UE 120, and the UE 120 may measure the configured set of CSI-RSs. Based on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples. The base station 110 may perform artificial noise injection at a precoding stage of channel processing based on reporting received from the UE 120.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random quadrature phase shift keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based on the measurements, and may use the SRS measurements to configure communications with the UE 120.

As indicated above, FIG. 4 is provided as an example. Other examples may differ from what is described with regard to FIG. 4.

Figure 5:
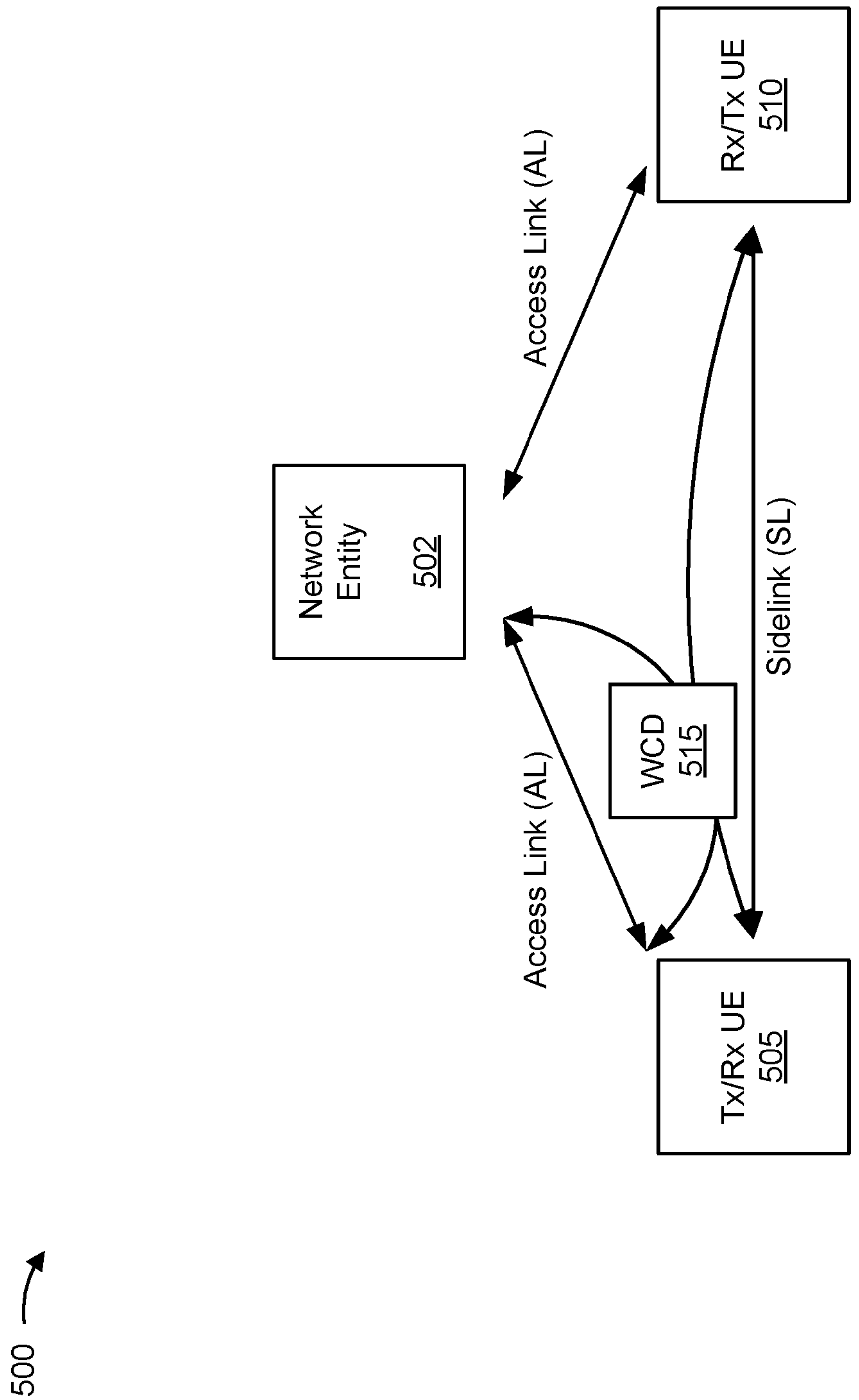
FIG. 5 is a diagram illustrating an example of sidelink communications and access link communications in the presence of an intercepting communication device, in accordance with the present disclosure.

FIG. 5 is a diagram illustrating an example 500 of sidelink communications and access link communications in the presence of an intercepting communication device, in accordance with the present disclosure.

As shown in FIG. 5, a transmitter (Tx)/receiver (Rx) UE 505 and an Rx/Tx UE 510 may communicate with one another via a sidelink. As further shown, in some sidelink modes, a network entity 502 may communicate with the Tx/Rx UE 505 via a first access link. Additionally, or alternatively, in some sidelink modes, the network entity 502 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network entity 502 and a UE 120 (e.g., via a Uu interface) may be referred to as an access link. Sidelink communications may be transmitted via the sidelink, and access link communications may be transmitted via the access link. An access link communication may be either a downlink communication (from a network entity 502 to a UE 120) or an uplink communication (from a UE 120 to a network entity 502).

As further shown in FIG. 5, an intercepting wireless communication device 515 may be within a communication path between Tx/Rx UE 505 and Rx/Tx UE 510 or network entity 502. In other words, intercepting wireless communication device 515 may eavesdrop on communications between Tx/Rx UE 505 and Rx/Tx UE 510 or between Tx/Rx UE 505 and network entity 502. Although some aspects are described herein in terms of security handling for physical uplink channels, aspects described herein may apply to security handling for other types of channels or for sidelink channels, among other examples.

As indicated above, FIG. 5 is provided as an example. Other examples may differ from what is described with respect to FIG. 5.

As described above, when a UE communicates with, for example, a network entity, an intercepting wireless communication device (e.g., another UE) may attempt to intercept and decode communications between the network entity and the UE. At an upper layer, such as at an application layer, a security scheme may be implemented to protect data associated with the upper layer (e.g., data associated with the application layer and above). However, secure information, that should not be intercepted by the intercepting wireless communication device, may also be generated at lower layers, such as the physical layer. A network entity may implement a physical layer security scheme by using channel characteristics to secure data at the physical layer. For example, the network entity or the UE may use physical layer security to secure control information (e.g., DCI, UCI, or sidelink control information (SCI)) or data channels (e.g., a PDSCH, a PUSCH, or a physical sidelink shared channel (PSSCH)), among other examples.

The network entity may use artificial noise injection techniques as at least a part of a physical layer security scheme. In an artificial noise injection technique, the network entity may inject artificial noise in a null space associated with a Tx/Rx channel pair. The artificial noise injection technique may include estimating a channel (e.g., using an SRS at the network entity), computing a null space matrix, and using columns of the null space matrix to precode artificial noise streams or layers, thereby affecting a signal to interference and noise ratio at an intercepting wireless communication device, which may prevent interception of physical layer data. However, based on the artificial noise injection precoding occurring in the null space of a communication, the UE may receive the communication without impairment.

Another technique that may be used for achieving channel randomness is use of a secret key. For example, in type-A secret key extraction, a network entity and a UE may transmit respective reference signals to enable estimation of respective channels (e.g., a downlink channel and an uplink channel). The network entity and the UE may use a metric associated with the respective channels (e.g., a channel power, a reference signal received power, a signal to interference and noise ratio (SINR) value, or a phase value) as an input to a key derivation function (see, e.g., 3GPP Technical Specification (TS) 33.220 version 11.4.0 Release 11 Annex B.2.2 for additional detail regarding key derivation functions). Using the key derivation function, the network entity and the UE may derive corresponding keys for encrypting transmissions and/or fields within a PHY channel. In some cases, the UE or the network entity may add some repetition of a pilot signal or a key refinement procedure to further secure the transmissions and/or fields within a PHY channel.

However, the network entity and the UE may lack signaling for conveying information that is to be used in artificial noise injection and/or secret key extraction associated therewith. Some aspects described herein enable a use of CSI reporting to enable artificial noise injection and/or secret key extraction associated therewith. For example, a UE may, in addition to other CSI reporting (e.g., of a widebeam or a PMI), provide information identifying a set of beams associated with artificial noise injection precoding. In this case, the set of beams may be one or more beams identified as having a worst channel metric, such as a worst layer 1 RSRP (L1-RSRP). The UE may report information identifying the set of beams, PMIs corresponding to the set of beams, RSRPs of the set of beams, CQIs for the set of beams, or RIs of the set of beams, among other examples. In this case, the network entity may use the additional information of the CSI reporting to perform artificial noise injection precoding and transmit one or more signals with artificial noise precoding to the UE. Based on enabling artificial noise precoding, the UE and the network entity improve information security for the one or more signals.

Figure 6A:
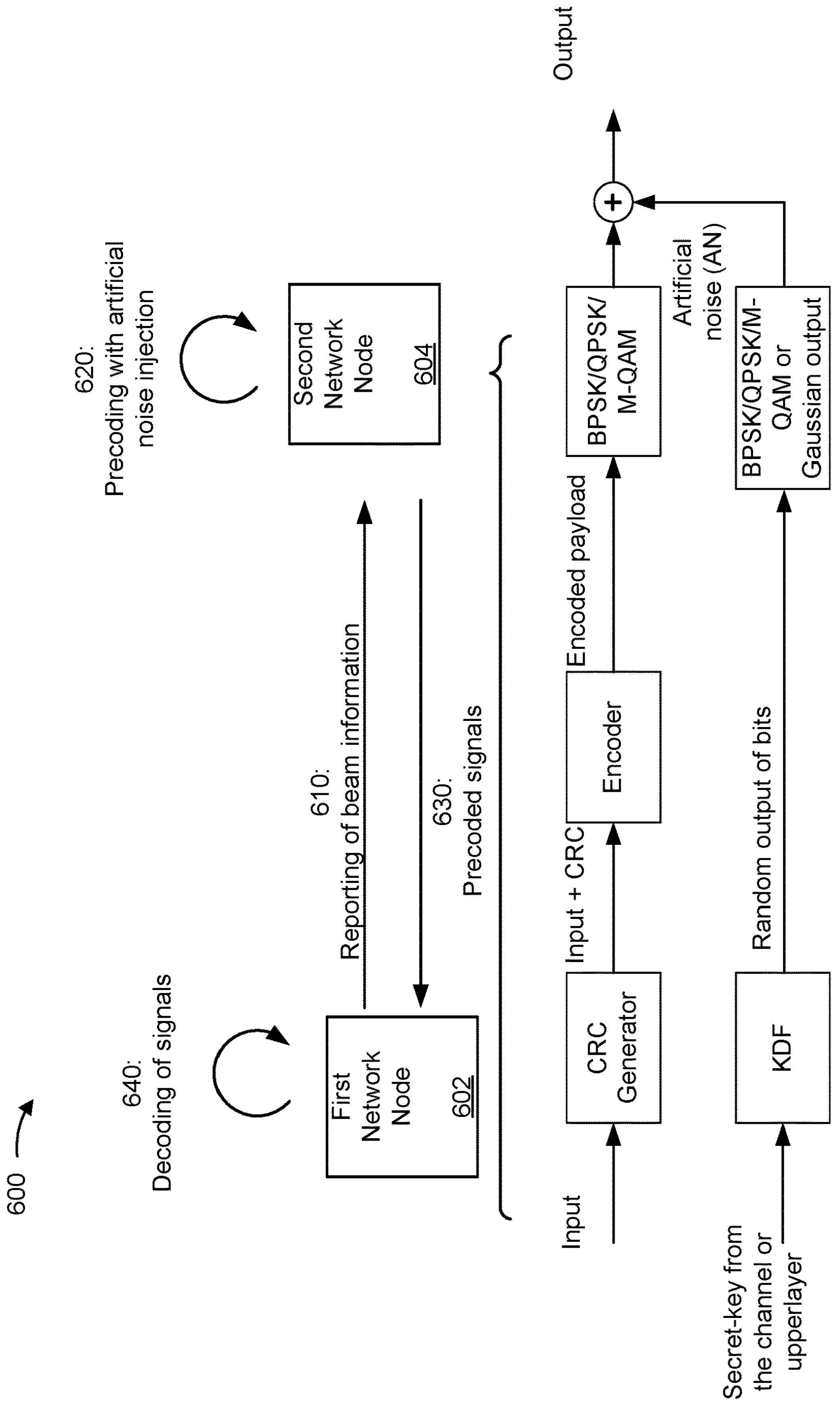
FIGS. 6A and 6B are diagrams illustrating examples associated with artificial noise injection in connection with channel state information reporting, in accordance with the present disclosure.
Figure 6B:
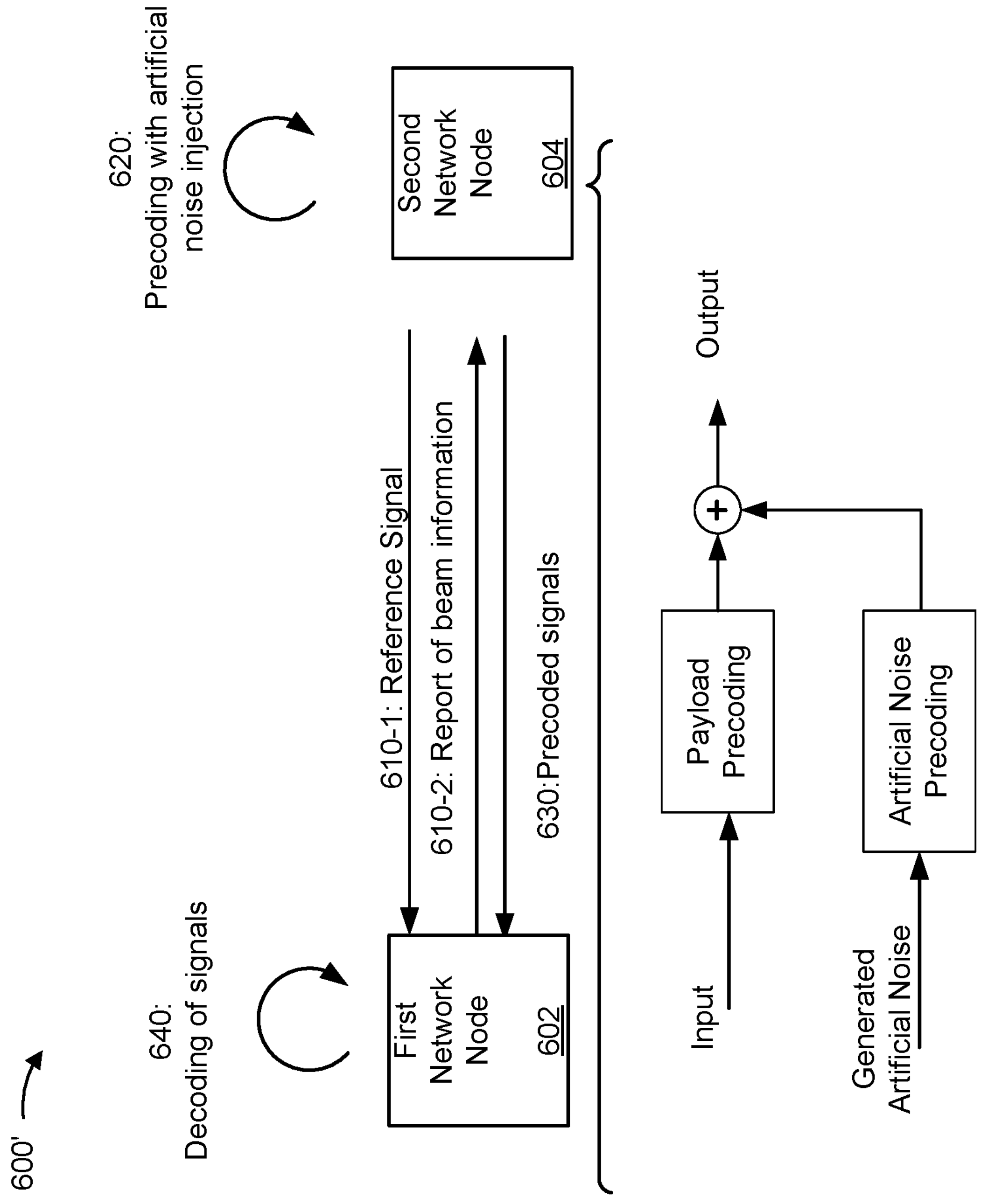

FIGS. 6A and 6B are diagrams illustrating examples 600/600' associated with artificial noise injection in connection with channel state information reporting, in accordance with the present disclosure. As shown in FIGS. 6A and 6B, examples 600/600' include communication between a first network node 602 (e.g., which may correspond to UE 120 or another wireless communication device described herein) and a second network node 604 (e.g., which may correspond to base station 110 or another wireless communication device described herein). In some aspects, the second network node 604 and first network node 602 may be included in a wireless network, such as wireless network 100. Second network node 604 and first network node 602 may communicate via a wireless access link, which may include an uplink and a downlink.

As further shown in FIG. 6A, and by reference numbers 610-1 and 610-2, first network node 602 may receive a reference signal and transmit a report of beam information to second network node 604. For example, first network node 602 may measure an unprecoded CSI-RS on a set of beams and report beam information for the set of beams to second network node 604. In some aspects, first network node 602 may receive a CSI-RS on a CSI-RS resource configured for artificial noise (AN) precoding. For example, second network node 604 may configure one or more CSI-RS resources (e.g., periodic resources, aperiodic resources, or semi-persistent resources) for artificial noise precoding. In some aspects, second network node 604 may precode the configuration information for the CSI-RS resources using artificial noise (e.g., injected based on a previously received report of beam information). In other words, one example of information that second network node 604 may secure or protect using artificial noise precoding associated with a CSI-RS report of beam information is configuration information for configuring a next CSI-RS report of beam information.

In some aspects, first network node 602 may include beam information relating to artificial noise precoding in the CSI-RS report to second network node 604. For example, first network node 602 may determine L1-RSRPs for a group of available beams, identify one or more worst beams from the group of available beams (e.g., one or more beams with a lowest L1-RSRP), and transmit information identifying the one or more worst beams. In this case, the information identifying the one or more worst beams may include information identifying one or more L1-RSRPs, one or more PMIs, one or more CQIs, or one or more RIs (e.g., which second network node 604 may use to determine a rank for artificial noise that is to be injected), among other examples.

In some aspects, first network node 602 may report a resource index (e.g., a CRI) for a beam. For example, when the CSI-RS is a precoded CSI-RS with a plurality of resources, first network node 602 may report one or more CRIs for one or more beams with a worst channel quality (e.g., a worst SINR) at first network node 602. In this case, second network node 604 may use the received one or more CRIs (and/or an SRS) to determine precoding or beamforming of artificial noise signals or streams, which may enable jamming or obstructing interception by an intercepting wireless communication device. In some aspects, a quantity of beams for which first network node 602 reports a CRI may be based on received signaling. For example, first network node 602 may receive RRC signaling, MAC control element (MAC-CE) signaling, or report configuration signaling indicating the quantity of beams for which first network node 602 is to report a CRI.

In some aspects, first network node 602 may report information relating to one or more analog beams. For example, first network node 602 may measure a set of analog beams associated with a set of SSBs and may report information identifying one or more worst beams of the set of analog beams in the beam information. In this way, the first network node 602 may enable analog beamforming by second network node 604, as described herein. In some aspects, second network node 604 may trigger joint analog and digital beam precoding based on an indication to start a secure session for finding beams for artificial noise injection. For example, second network node 604 may transmit RRC signaling, MAC CE signaling, or DCI indicating that first network node 602 is to report one or more worst analog beams.

As further shown in FIG. 6A, and by reference numbers 620 and 630, second network node 604 may precode one or more signals with artificial noise injection and transmit the precoded signals to first network node 602. In this case, the second network node 604 may transmit data signals protected by precoded artificial noise signals. For example, second network node 604 may inject artificial noise into a null space in one or more (data) signals for transmission to first network node 602 to prevent an intercepting wireless communication device from successfully decoding the one or more signals at a physical layer without interfering with first network node 602 in successfully decoding the one or more signals at the physical layer.

In some aspects, second network node 604 may precode or beamform an artificial noise signal or stream. For example, second network node 604 may use a received CRI or an SRS to determine precoding or beamforming for an artificial noise signal or stream to jam or obstruct an intercepting wireless communication device. In some aspects, second network node 604 may determine a quantity of layers for injected artificial noise. For example, second network node 604 may determine the quantity of layers based on a received rank indicator identifying a rank for the artificial noise.

In some aspects, second network node 604 may perform joint analog and digital beam precoding for artificial noise injection. For example, second network node 604 may use beam information identifying one or more analog beams to select a beam for transmitting artificial noise injected into the (null space associated with the) one or more signals. In this case, the beam for transmitting the artificial noise may be quasi-co-located with an identified analog beam of the beam information (e.g., a worst SSB beam with a worst CSI-RS reported by the first network node 602).

In some aspects, second network node 604 may use a shared secret key to enable first network node 602 to cancel any residual interference caused by the injection of artificial noise into the null space between one or more transmitted signals. For example, second network node 604 and first network node 602 may use a symmetric key, a Rivest-Shamir-Adleman (RSA) key, a Diffie-Hellman key exchange key, an elliptic curve cryptography (ECC) key, among other examples. In some aspects, the key may be based on a state of a physical layer (e.g., channel reciprocity and randomness). For example, second network node 604 may generate artificial noise based on Gaussian random signals or quadrature amplitude modulation (QAM) random signals where constellation points are selected for each resource element based on a secret key common to second network node 604 and first network node 602.

In this case, second network node 604 may use the secret key as a seed or input to a key derivation function to generate a random or pseudo-random signal. In some aspects, second network node 604 may use the secret key as a seed to enable generation of a longer sequence of pseudo-random bits than the secret key itself. In some aspects, a sub-channel (e.g., resource element) index may be input to a pseudo-random generator to enable first network node 602 to distinguish bits across different resource elements. As an example, as shown in FIGS. 6A, based on inputting the secret key to the key derivation function (KDF), second network node 604 may generate a random output of bits from the key derivation function to use to generate ON-OFF keying (OOK), binary phase shift keying (BPSK), quadrature phase shift keying (QPSK), M-ary QAM (M-QAM), M-ary PSK (M-PSK), pulse-position modulation signal (PPM), Bernoulli, exponential, or Gaussian output of artificial noise. The second network node 604 generates a cyclic redundancy check (CRC) from input information (e.g., data, control information, or DCI), encodes the CRC and the input information, modulates the encoded information (e.g., using ON-OFF keying, QPSK, M-QAM, M-PSK, PPM, Bernoulli, exponential, or Gaussian modulation) and maps the modulated information to the artificial noise to generate an output signal. In this case, based on first network node 602 having a corresponding secret key (e.g., as a result of a key exchange procedure), first network node 602 may regenerate the signals of second network node 604 to enable canceling of the artificial noise prior to data decoding. In this way, first network node 602 and second network node 604 improve an accuracy of data decoding, thereby decreasing a likelihood of dropped communication.

In some aspects, second network node 604 may separately precode artificial noise and payload data. For example, as shown in FIG. 6B, second network node 604 may apply separate precoding to the artificial noise and to the payload data (e.g., using separate transmit chains or a single transmit chain with separate precoding steps. In some aspects, precoding may be based on a beam reported by first network node 602. For example, second network node 604 may receive a report of a set of worst beams from first network node 602 and select one or more of the set of worst beams to precode the artificial noise.

In some aspects, a precoder of second network node 604 uses the secret key-generated artificial noise as input and adds the artificial noise at a QAM symbol level. Alternatively, second network node 604 may apply precoding before adding the artificial noise to payload of one or more signals that are to be conveyed. Alternatively, second network node 604 may apply precoding without using a secret key (e.g., and may precode artificial noise based on identified worst beams without using the secret key).

As further shown in FIG. 6A, and by reference number 640, first network node 602 may decode the signals that are precoded with artificial noise injection. For example, first network node 602 may decode the signals based on decoding beams of a TX-RX pair other than the artificial noise injected into the null space between the TX-RX pair. In some aspects, first network node 602 may use a secret key to decode the signals. For example, first network node 602 may generate pseudo-random data using a secret key corresponding to a secret key of second network node 604 and use the generated pseudo-random data to cancel injected pseudo-random data by second network node 604. In some aspects, second network node 604 may transmit a demodulation reference signal (DMRS) associated with precoded artificial noise. First network node 602 may receive the DMRS and use the DMRS to estimate a precoded channel between first network node 602 and second network node 604 to cancel or remove AN more efficiently. For example, the DMRS may be associated with one or more precoded AN signals. One or more data signals protected by the one or more precoded AN signals may be decodable based on the DMRS associated with the one or more precoded AN signals. For example, first network node 602 may receive the one or more data signals protected by one or more precoded AN signals. First network node 602 may receive a DMRS associated with the one or more precoded AN signals. In some aspects, first network node 602 may remove AN associated with the one or more precoded AN signals based on, for example, a secret key associated with an AN sequence of the one or more precoded AN signals and/or the DMRS associated with the one or more precoded AN signals. In such aspects, first network node 602 may decode the one or more data signals after removal of the AN.

As indicated above, FIGS. 6A and 6B is provided as an example. Other examples may differ from what is described with respect to FIGS. 6A and 6B.

Figure 7:
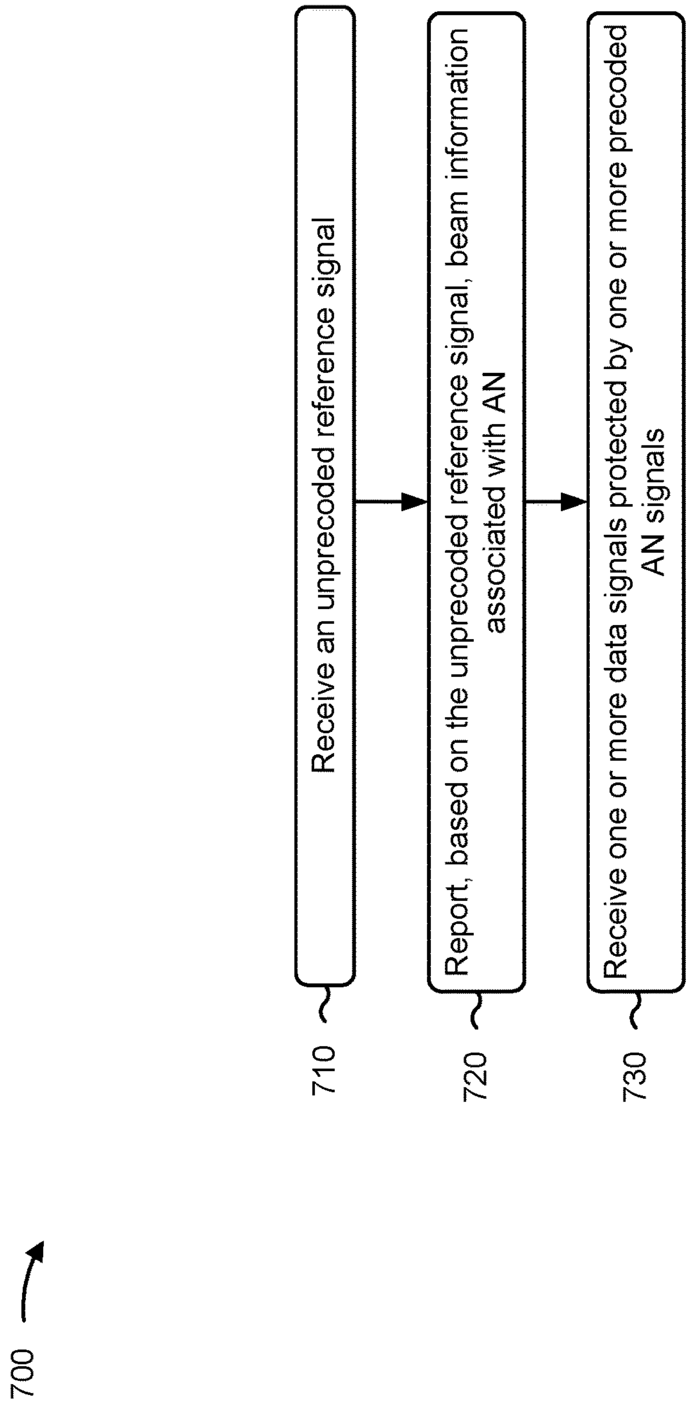
FIGS. 7-8 are diagrams illustrating example processes associated with artificial noise injection in connection with channel state information reporting, in accordance with the present disclosure.

FIG. 7 is a diagram illustrating an example process 700 performed, for example, by a network node, in accordance with the present disclosure. Example process 700 is an example where the network node (e.g., first network node 602 or UE 120) performs operations associated with artificial noise injection in connection with channel state information reporting.

As shown in FIG. 7, in some aspects, process 700 may include receiving an unprecoded reference signal (block 710). For example, the network node (e.g., using communication manager 140 and/or reception component 902, depicted in FIG. 9) may receive an unprecoded reference signal, as described above.

As further shown in FIG. 7, in some aspects, process 700 may include reporting, based on the unprecoded reference signal, beam information associated with AN (block 720). For example, the network node (e.g., using communication manager 140 and/or reporting component 908, depicted in FIG. 9) may report, based on the unprecoded reference signal, beam information associated with AN, as described above.

As further shown in FIG. 7, in some aspects, process 700 may include receiving one or more data signals protected by one or more precoded AN signals, wherein the one or more precoded AN signals are based on the beam information (block 730). For example, the network node (e.g., using communication manager 140 and/or reception component 902, depicted in FIG. 9) may receive one or more data signals protected by one or more precoded AN signals, wherein the one or more precoded AN signals are based on the beam information, as described above.

Process 700 may include additional aspects, such as any single aspect or any combination of aspects described below and/or in connection with one or more other processes described elsewhere herein.

In a first aspect, process 700 includes decoding the one or more data signals.

In a second aspect, alone or in combination with the first aspect, the network node is configured to decode the one or more data signals without removing AN associated with the one or more precoded AN signals.

In a third aspect, alone or in combination with one or more of the first and second aspects, process 700 includes removing AN, associated with the one or more precoded AN signals, using a secret key associated with an AN sequence of the one or more precoded AN signals, decoding the one or more data signals after removal of the AN using the secret key.

In a fourth aspect, alone or in combination with one or more of the first through third aspects, the one or more precoded AN signals are associated with codebook or non-codebook based precoding, and wherein the one or more processors, to report the beam information, are configured to reporting at least one of information identifying a set of beams with less than a threshold reference signal received power or a channel quality indicator.

In a fifth aspect, alone or in combination with one or more of the first through fourth aspects, a rank of AN precoding of the one or more precoded AN signals is based on a rank indicator associated with the beam information.

In a sixth aspect, alone or in combination with one or more of the first through fifth aspects, the one or more data signals are associated with a channel state information reference signal precoded based on a plurality of resources, and wherein the one or more processors, to report the beam information, are configured to reporting information identifying one or more resource indices of one or more beams with less than a threshold signal to interference and noise ratio.

In a seventh aspect, alone or in combination with one or more of the first through sixth aspects, AN precoding of the one or more precoded AN signals is based on a sounding reference signal.

In an eighth aspect, alone or in combination with one or more of the first through seventh aspects, a quantity of beams reported in the beam information is based on at least one of an RRC configuration, a MAC CE configuration, or a report configuration.

In a ninth aspect, alone or in combination with one or more of the first through eighth aspects, the beam information is reported in a channel state information reference signal resource, allocated for AN precoding, that is precoded with AN.

In a tenth aspect, alone or in combination with one or more of the first through ninth aspects, the beam information includes information identifying one or more analog beams, associated with one or more synchronization signal blocks, associated with less than a threshold channel metric.

In an eleventh aspect, alone or in combination with one or more of the first through tenth aspects, a channel state information reference signal resource associated with reporting the beam information is quasi-co-located with a beam reported in the beam information.

In a twelfth aspect, alone or in combination with one or more of the first through eleventh aspects, process 700 includes receiving a triggering message that indicates how to report the beam information, and wherein the one or more processors, to report the beam information, are configured to reporting, based on the triggering message, the beam information in at least one of an RRC message, a MAC CE, or DCI.

In a thirteenth aspect, alone or in combination with one or more of the first through twelfth aspects, the one or more precoded AN signals are associated with AN generated based on a secret key available to the network node.

In a fourteenth aspect, alone or in combination with one or more of the first through thirteenth aspects, the one or more precoded AN signals are associated with AN generated based on at least one of a Gaussian signal, a quadrature amplitude modulation signal, an on-off keying signal, an amplitude-shift keying signal, a phase shift keying signal, a pulse-position modulation signal, a Bernoulli signal, or an exponential signal.

In a fifteenth aspect, alone or in combination with one or more of the first through fourteenth aspects, process 700 includes decoding the one or more data signals based on a secret key available to a source of the one or more data signals.

In a sixteenth aspect, alone or in combination with one or more of the first through fifteenth aspects, process 700 includes decoding the one or more data signals based on whether there is one AN source or multiple AN sources.

In a seventeenth aspect, alone or in combination with one or more of the first through sixteenth aspects, process 700 includes decoding the one or more data signals based on a secret key or a reported beam.

In an eighteenth aspect, alone or in combination with one or more of the first through seventeenth aspects, process 700 includes removing AN associated with the one or more precoded AN signals based on a secret key associated with an AN sequence of the one or more precoded AN signals and a DMRS associated with the one or more precoded AN signals; and decoding the one or more data signals after removal of the AN.

In a nineteenth aspect, alone or in combination with one or more of the first through eighteenth aspects, process 700 includes decoding the one or more data signals based on a secret key available to a source of the one or more data signals and a DMRS associated with the one or more precoded AN signals.

In a twentieth aspect, alone or in combination with one or more of the first through nineteenth aspects, process 700 includes decoding the one or more data signals based on a DMRS associated with the one or more precoded AN signals.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
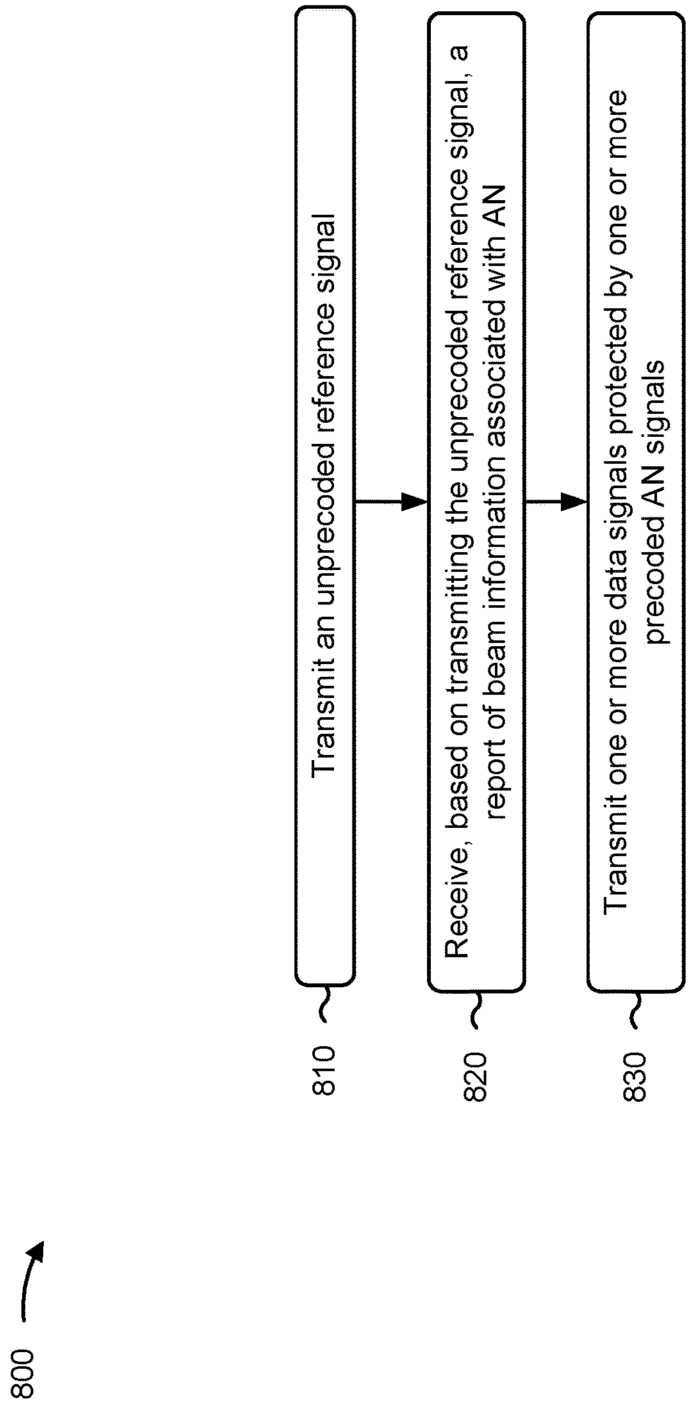

FIG. 8 is a diagram illustrating an example process 800 performed, for example, by a network node, in accordance with the present disclosure. Example process 800 is an example where the network node (e.g., base station 110, network entity 502, or second network node 604, among other examples) performs operations associated with artificial noise injection in connection with channel state information reporting.

As shown in FIG. 8, in some aspects, process 800 may include transmitting an unprecoded reference signal (block 810). For example, the network node (e.g., using communication manager 150 and/or transmission component 1004, depicted in FIG. 10) may transmit an unprecoded reference signal, as described above.

As further shown in FIG. 8, in some aspects, process 800 may include receiving, based on transmitting the unprecoded reference signal, a report of beam information associated with AN (block 820). For example, the network node (e.g., using communication manager 150 and/or reception component 1002, depicted in FIG. 10) may receive, based on transmitting the unprecoded reference signal, a report of beam information associated with AN, as described above.

As further shown in FIG. 8, in some aspects, process 800 may include transmitting one or more data signals protected by one or more precoded AN signals, wherein the one or more precoded AN signals are based on the beam information (block 830). For example, the network node (e.g., using communication manager 150 and/or transmission component 1004, depicted in FIG. 10) may transmit one or more data signals protected by one or more precoded AN signals, wherein the one or more precoded AN signals are based on the beam information, as described above.

Process 800 may include additional aspects, such as any single aspect or any combination of aspects described below and/or in connection with one or more other processes described elsewhere herein.

In a first aspect, the one or more data signals are decodable without removing AN associated with the one or more precoded AN signals.

In a second aspect, alone or in combination with the first aspect, AN, associated with the one or more precoded AN signals, is removable using a secret key associated with an AN sequence of the one or more precoded AN signals, and wherein the one or more data signals are decodable after removal of the AN using the secret key.

In a third aspect, alone or in combination with one or more of the first and second aspects, the one or more precoded AN signals are associated with codebook or non-codebook based precoding, and wherein the one or more processors, to receive the report of the beam information, are configured to receiving at least one of information identifying a set of beams with less than a threshold reference signal received power or a channel quality indicator.

In a fourth aspect, alone or in combination with one or more of the first through third aspects, a rank of the AN precoding of the one or more precoded AN signals is based on a rank indicator associated with the beam information.

In a fifth aspect, alone or in combination with one or more of the first through fourth aspects, the one or more data signals are associated with a channel state information reference signal precoded based on a plurality of resources, and wherein the one or more processors, to receive the report of the beam information, are configured to receiving information identifying one or more resource indices of one or more beams with less than a threshold signal to interference and noise ratio.

In a sixth aspect, alone or in combination with one or more of the first through fifth aspects, the AN precoding of the one or more precoded AN signals is based on a sounding reference signal.

In a seventh aspect, alone or in combination with one or more of the first through sixth aspects, a quantity of beams reported in the beam information is based on at least one of an RRC configuration, a MAC CE configuration, or a report configuration.

In an eighth aspect, alone or in combination with one or more of the first through seventh aspects, the report of the beam information is received in a channel state information reference signal resource, allocated for AN precoding, that is precoded with AN.

In a ninth aspect, alone or in combination with one or more of the first through eighth aspects, the beam information includes information identifying one or more analog beams, associated with one or more synchronization signal blocks, associated with less than a threshold channel metric.

In a tenth aspect, alone or in combination with one or more of the first through ninth aspects, a channel state information reference signal resource associated with reporting the beam information is quasi-co-located with a beam reported in the beam information.

In an eleventh aspect, alone or in combination with one or more of the first through tenth aspects, process 800 includes transmitting a triggering message that indicates how to report the beam information, and wherein the one or more processors, to receive the report of the beam information, are configured to receiving, based on the triggering message, the report of the beam information in at least one of an RRC message, a MAC CE, or DCI.

In a twelfth aspect, alone or in combination with one or more of the first through eleventh aspects, the one or more precoded AN signals are associated with AN generated based on a secret key.

In a thirteenth aspect, alone or in combination with one or more of the first through twelfth aspects, the one or more precoded AN signals are associated with AN generated based on at least one of a Gaussian signal, a quadrature amplitude modulation signal, an on-off keying signal, an amplitude-shift keying signal, a phase shift keying signal, a pulse-position modulation signal, a Bernoulli signal, or an exponential signal.

In a fourteenth aspect, alone or in combination with one or more of the first through thirteenth aspects, process 800 includes precoding the one or more precoded AN signals based on a secret key available to the network node.

In a fifteenth aspect, alone or in combination with one or more of the first through fourteenth aspects, AN associated with the one or more precoded AN signals is removable based on a secret key associated with an AN sequence of the one or more precoded AN signals and a demodulation reference signal (DMRS) associated with the one or more precoded AN signals, and the one or more data signals are decodable after removal of the AN using the secret key.

In a sixteenth aspect, alone or in combination with one or more of the first through fifteenth aspects, process 800 includes transmitting a DMRS associated with the one or more precoded AN signals, and wherein the one or more data signals are decodable based on the DMRS.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
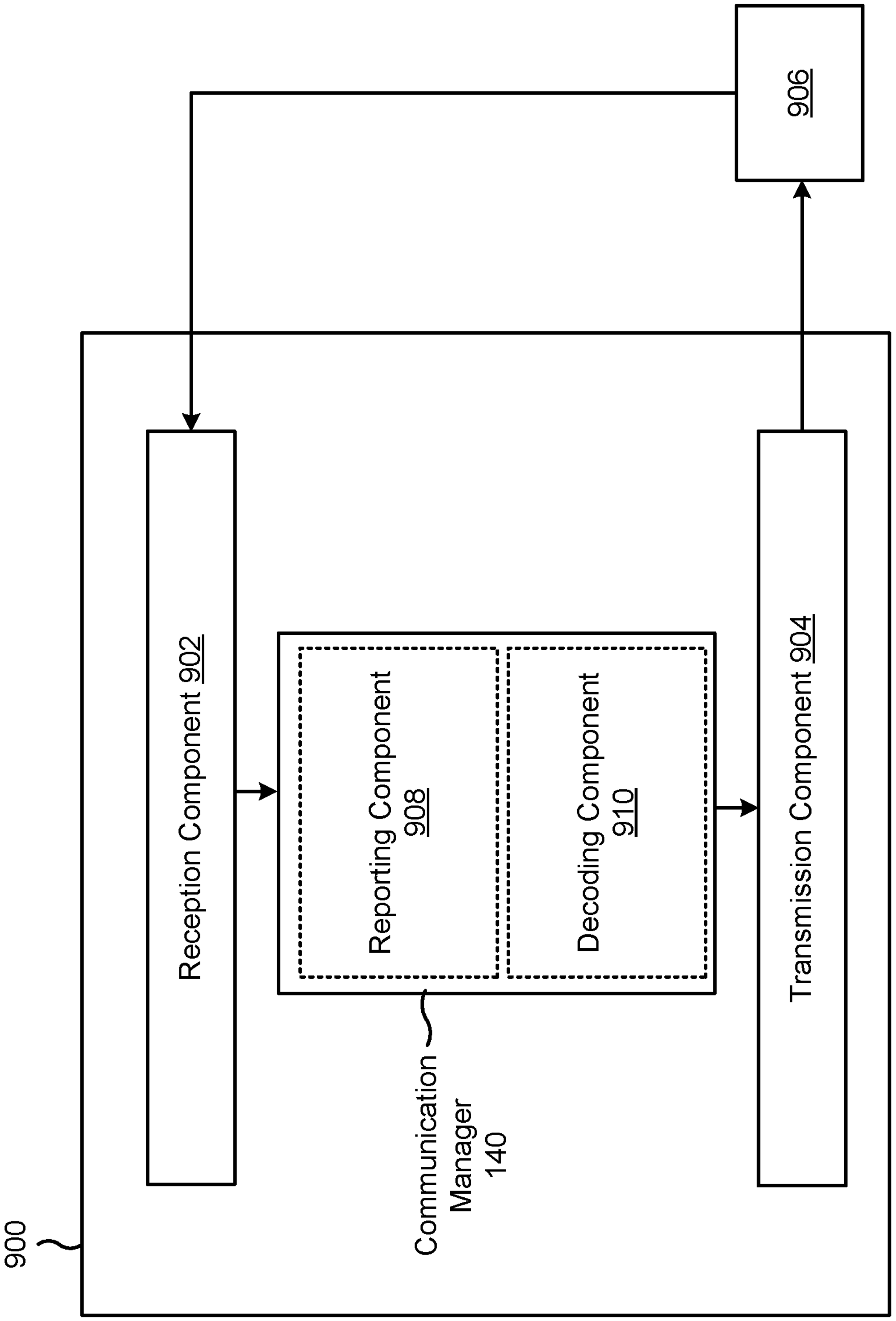
FIGS. 9-10 are diagrams of example apparatuses for wireless communication, in accordance with the present disclosure.

FIG. 9 is a diagram of an example apparatus 900 for wireless communication. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a network node, UE, a base station, a network entity, or another wireless communication device) using the reception component 902 and the transmission component 904. As further shown, the apparatus 900 may include the communication manager 140. The communication manager 140 may include one or more of a reporting component 908 or a decoding component 910, among other examples.

In some aspects, the apparatus 900 may be configured to perform one or more operations described herein in connection with FIGS. 6A and 6B. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive an unprecoded reference signal. The reporting component 908 may report, based on the unprecoded reference signal, beam information associated with AN. The reception component 902 may receive one or more data signals protected by one or more precoded AN signals, wherein the one or more precoded AN signals are based on the beam information. The decoding component 910 may decode the one or more data signals. The decoding component 910 may remove AN, associated with the one or more precoded AN signals, using a secret key associated with an AN sequence of the one or more precoded AN signals and decode the one or more data signals after removal of the AN using the secret key. The reception component 902 may receive a triggering message indicating how to report the beam information (e.g., in at least one of a radio resource control message, a medium access control control element, or downlink control information). The decoding component 910 may decode the one or more signals based on a secret key available to the apparatus 900 and/or the apparatus 906.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
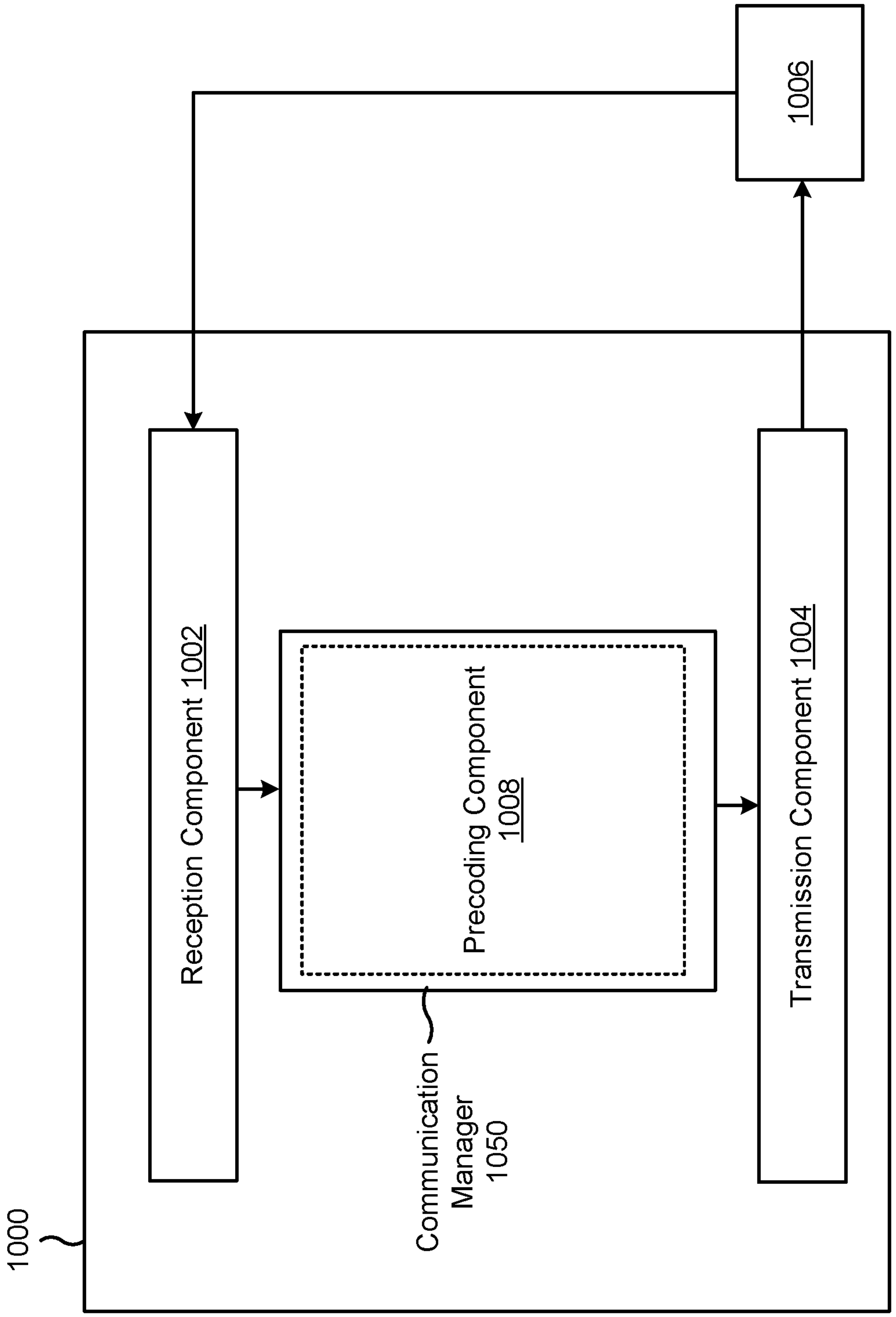

FIG. 10 is a diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a network node, a UE, a base station, a network entity, or another wireless communication device) using the reception component 1002 and the transmission component 1004. As further shown, the apparatus 1000 may include the communication manager 1050 (e.g., the communication manager 150). The communication manager 1050 may include a precoding component 1008, among other examples.

In some aspects, the apparatus 1000 may be configured to perform one or more operations described herein in connection with FIGS. 6A and 6B. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit an unprecoded reference signal. The reception component 1002 may receive, based on transmitting the unprecoded reference signal, a report of beam information associated with AN. The transmission component 1004 may transmit one or more data signals protected by one or more precoded AN signals, wherein the one or more precoded AN signals are based on the beam information. The transmission component 1004 may transmit a triggering message to indicate how to report the beam information (e.g., to report the beam information in at least one of a radio resource control message, a medium access control control element, or downlink control information). The precoding component 1008 may precode the one or more precoded AN signals based on a secret key available to the apparatus 1000 or the apparatus 1006.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
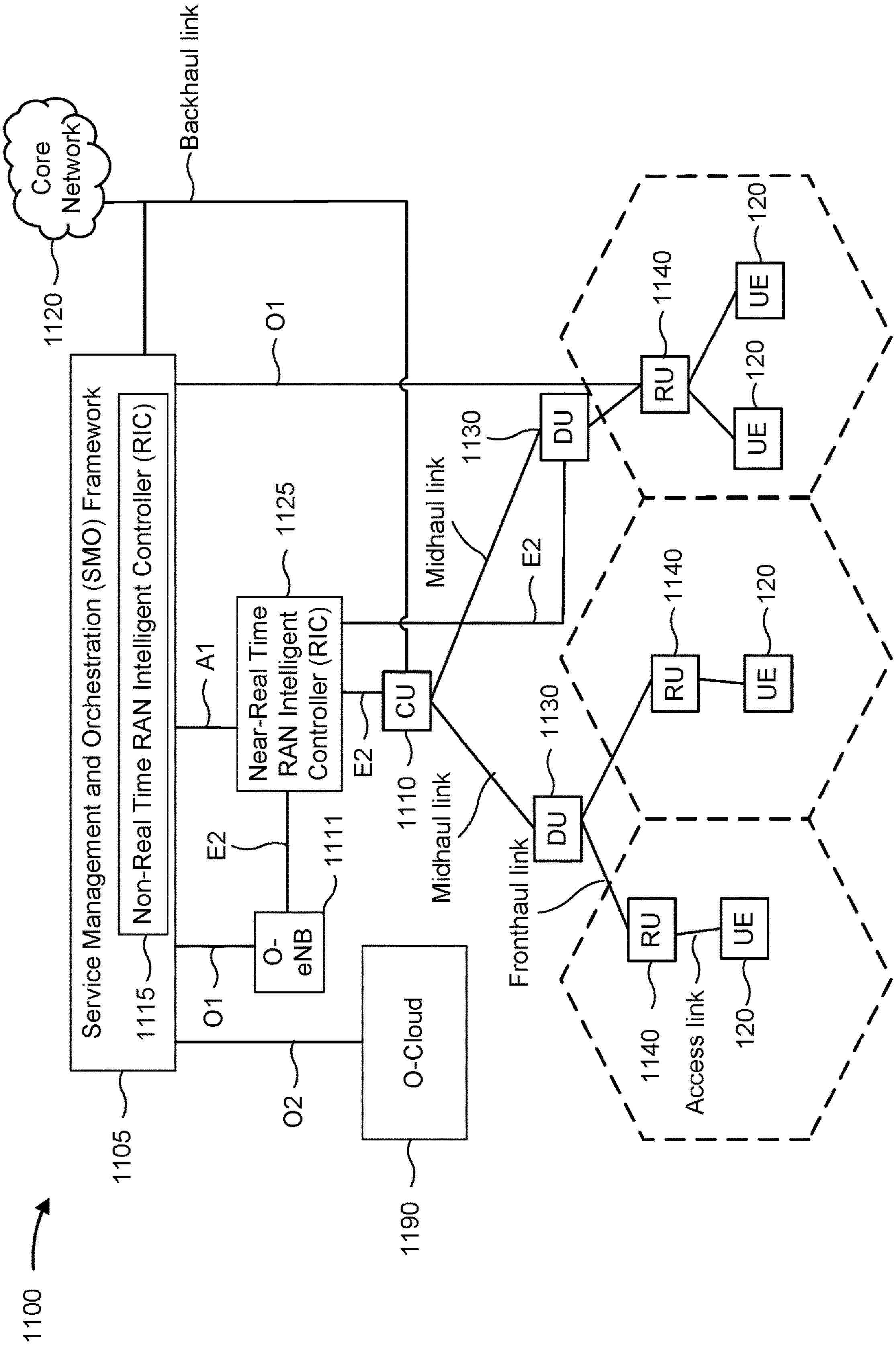
FIG. 11 is a diagram illustrating an example of a disaggregated base station architecture, in accordance with the present disclosure.

FIG. 11 shows an example of a disaggregated base station architecture 1100. The disaggregated base station architecture 1100 shown in FIG. 11 may include one or more CUs 1110 that can communicate directly with a core network 1120 via a backhaul link, or indirectly with the core network 1120 through one or more disaggregated base station units (such as a Near-Real Time (Near-RT) RAN Intelligent Controller (RIC) 1125 via an E2 link, or a Non-Real Time (Non-RT) RIC 1115 associated with a Service Management and Orchestration (SMO) Framework 1105, or both). A CU 1110 may communicate with one or more DUs 1130 via respective midhaul links, such as an F1 interface. The DUs 1130 may communicate with one or more RUs 1140 via respective fronthaul links. The RUs 1140 may communicate with respective UEs 120 via one or more radio frequency (RF) access links. In some implementations, the UE 120 may be simultaneously served by multiple RUs 1140.

Each of the units (e.g., the CUS 1110, the DUs 1130, the RUs 1140), as well as the Near-RT RICs 1125, the Non-RT RICs 1115, and the SMO Framework 1105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1110. The CU 1110 may be configured to handle user plane functionality (e.g., Central Unit-User Plane (CU-UP)), control plane functionality (e.g., Central Unit-Control Plane (CU-CP)), or a combination thereof. In some implementations, the CU 1110 can be logically split into one or more CU-UP units and one or more CU-CP units. The CU-UP unit can communicate bidirectionally with the CU-CP unit via an interface, such as the E1 interface when implemented in an O-RAN configuration. The CU 1110 can be implemented to communicate with the DU 1130, as necessary, for network control and signaling.

The DU 1130 may correspond to a logical unit that includes one or more base station functions to control the operation of one or more RUs 1140. In some aspects, the DU 1130 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 1130 may further host one or more low-PHY layers. Each layer (or module) can be implemented with an interface configured to communicate signals with other layers (and modules) hosted by the DU 1130, or with the control functions hosted by the CU 1110.

Lower-layer functionality can be implemented by one or more RUs 1140. In some deployments, an RU 1140, controlled by a DU 1130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 1140 can be implemented to handle over the air (OTA) communication with one or more UEs 120. In some implementations, real-time and non-real-time aspects of control and user plane communication with the RU(s) 1140 can be controlled by the corresponding DU 1130. In some scenarios, this configuration can enable the DU(s) 1130 and the CU 1110 to be implemented in a cloud-based RAN architecture, such as a vRAN architecture.

The SMO Framework 1105 may be configured to support RAN deployment and provisioning of non-virtualized and virtualized network elements. For non-virtualized network elements, the SMO Framework 1105 may be configured to support the deployment of dedicated physical resources for RAN coverage requirements which may be managed via an operations and maintenance interface (such as an O1 interface). For virtualized network elements, the SMO Framework 1105 may be configured to interact with a cloud computing platform (such as an open cloud (O-Cloud) 1190) to perform network element life cycle management (such as to instantiate virtualized network elements) via a cloud computing platform interface (such as an O2 interface). Such virtualized network elements can include, but are not limited to, CUs 1110, DUs 1130, RUs 1140 and Near-RT RICs 1125. In some implementations, the SMO Framework 1105 can communicate with a hardware aspect of a 4G RAN, such as an open eNB (O-eNB) 1111, via an O1 interface. Additionally, in some implementations, the SMO Framework 1105 can communicate directly with one or more RUs 1140 via an O1 interface. The SMO Framework 1105 also may include a Non-RT RIC 1115 configured to support functionality of the SMO Framework 1105.

The Non-RT RIC 1115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1125. The Non-RT RIC 1115 may be coupled to or communicate with (such as via an A1 interface) the Near-RT RIC 1125. The Near-RT RIC 1125 may be configured to include a logical function that enables near-real-time control and optimization of RAN elements and resources via data collection and actions over an interface (such as via an E2 interface) connecting one or more CUs 1110, one or more DUs 1130, or both, as well as an O-eNB, with the Near-RT RIC 1125.

In some implementations, to generate AI/ML models to be deployed in the Near-RT RIC 1125, the Non-RT RIC 1115 may receive parameters or external enrichment information from external servers. Such information may be utilized by the Near-RT RIC 1125 and may be received at the SMO Framework 1105 or the Non-RT RIC 1115 from non-network data sources or from network functions. In some examples, the Non-RT RIC 1115 or the Near-RT RIC 1125 may be configured to tune RAN behavior or performance. For example, the Non-RT RIC 1115 may monitor long-term trends and patterns for performance and employ AI/ML models to perform corrective actions through the SMO Framework 1105 (such as reconfiguration via O1) or via creation of RAN management policies (such as A1 policies).

As indicated above, FIG. 11 is provided as an example. Other examples may differ from what is described with regard to FIG. 11.

The following provides an overview of some Aspects of the present disclosure:

Aspect 1: A method of wireless communication performed by a network node, comprising: receiving an unprecoded reference signal; reporting, based on the unprecoded reference signal, beam information associated with artificial noise (AN); and receiving one or more data signals protected by one or more precoded AN signals, wherein the one or more precoded AN signals are based on the beam information.

Aspect 2: The method of Aspect 1, further comprising: decoding the one or more data signals.

Aspect 3: The method of Aspect 1, wherein further comprising: decoding the one or more data signals without removing AN associated with the one or more precoded AN signals.

Aspect 4: The method of Aspect 1, further comprising: removing, using a secret key associated with an AN sequence of the one or more precoded AN signals, AN associated with the one or more precoded AN signals; and decoding the one or more data signals after removal of the AN using the secret key.

Aspect 5: The method of any of Aspects 1 to 4, wherein the one or more precoded AN signals are associated with codebook or non-codebook based precoding; and wherein reporting the beam information comprises: reporting at least one of: information identifying a set of beams with less than a threshold reference signal received power or a channel quality indicator.

Aspect 6: The method of Aspect 5, wherein a rank of AN precoding of the one or more precoded AN signals is based on a rank indicator associated with the beam information.

Aspect 7: The method of any of Aspects 1 to 6, wherein the one or more data signals are associated with a channel state information reference signal precoded based on a plurality of resources, and wherein reporting the beam information comprises: reporting information identifying one or more resource indices of one or more beams with less than a threshold signal to interference and noise ratio.

Aspect 8: The method of any of Aspects 1 to 7, wherein AN precoding of the one or more precoded AN signals is based on a sounding reference signal.

Aspect 9: The method of any of Aspects 1 to 8, wherein a quantity of beams reported in the beam information is based on at least one of: a radio resource control configuration, a medium access control (MAC) control element configuration, or a report configuration.

Aspect 10: The method of any of Aspects 1 to 9, wherein the beam information is reported in a channel state information reference signal resource, allocated for AN precoding, that is precoded with AN.

Aspect 11: The method of any of Aspects 1 to 10, wherein the beam information includes information identifying one or more analog beams, associated with one or more synchronization signal blocks, associated with less than a threshold channel metric.

Aspect 12: The method of any of Aspects 1 to 11, wherein a channel state information reference signal resource associated with reporting the beam information is quasi-co-located with a beam reported in the beam information.

Aspect 13: The method of any of Aspects 1 to 12, further comprising: receiving a triggering message that indicates how to report the beam information; and wherein reporting the beam information comprises: reporting, based on the triggering message, the beam information in at least one of a radio resource control message, a medium access control control element, or downlink control information.

Aspect 14: The method of any of Aspects 1 to 13, wherein the one or more precoded AN signals are associated with AN generated based on a secret key available to the network node.

Aspect 15: The method of any of Aspects 1 to 14, wherein the one or more precoded AN signals are associated with AN generated based on at least one of: a Gaussian signal, a quadrature amplitude modulation signal, an on-off keying signal, an amplitude-shift keying signal, a phase shift keying signal, a pulse-position modulation signal, a Bernoulli signal, or an exponential signal.

Aspect 16: The method of any of Aspects 1 to 15, further comprising: decoding the one or more data signals based on a secret key available to a source of the one or more data signals.

Aspect 17: The method of any of Aspects 1 to 16, further comprising: decoding the one or more data signals based on whether there is one AN source or multiple AN sources.

Aspect 18: The method of any of Aspects 1 to 17, further comprising: decoding the one or more data signals based on at least one of a secret key or a reported beam.

Aspect 19: The method of any of aspects 1 to 18, further comprising removing AN associated with the one or more precoded AN signals based on a secret key associated with an AN sequence of the one or more precoded AN signals and a demodulation reference signal (DMRS) associated with the one or more precoded AN signals; and decoding the one or more data signals after removal of the AN.

Aspect 20: The method of any of aspects 1 to 19, further comprising decoding the one or more data signals based on a secret key available to a source of the one or more data signals and a demodulation reference signal (DMRS) associated with the one or more precoded AN signals.

Aspect 21: The method of any of aspects 1 to 20, further comprising decoding the one or more data signals based on a demodulation reference signal (DMRS) associated with the one or more precoded AN signals.

Aspect 22: A method of wireless communication performed by a network node, comprising: transmitting an unprecoded reference signal; receiving, based on transmitting the unprecoded reference signal, a report of beam information associated with artificial noise (AN); and transmitting one or more data signals protected by one or more precoded AN signals, wherein the one or more precoded AN signals are based on the beam information.

Aspect 23: The method of Aspect 22, wherein the one or more data signals are decodable without removing AN associated with the one or more precoded AN signals.

Aspect 24: The method of Aspect 22, wherein AN associated with the one or more precoded AN signals is removable using a secret key associated with an AN sequence of the one or more precoded AN signals, and wherein the one or more data signals are decodable after removal of the AN using the secret key.

Aspect 25: The method of Aspect 22, wherein the one or more precoded AN signals are associated with codebook or non-codebook based precoding; and wherein receiving the report of the beam information comprises: receiving at least one of: information identifying a set of beams with less than a threshold reference signal received power or a channel quality indicator.

Aspect 26: The method of Aspect 25, wherein a rank of the AN precoding of the one or more precoded AN signals is based on a rank indicator associated with the beam information.

Aspect 27: The method of any of Aspects 22 to 26, wherein the one or more data signals are associated with a channel state information reference signal precoded based on a plurality of resources, and wherein receiving the report of the beam information comprises: receiving information identifying one or more resource indices of one or more beams with less than a threshold signal to interference and noise ratio.

Aspect 28: The method of any of Aspects 22 to 27, wherein the AN precoding of the one or more precoded AN signals is based on a sounding reference signal.

Aspect 29: The method of any of Aspects 22 to 28, wherein a quantity of beams reported in the beam information is based on at least one of: a radio resource control configuration, a medium access control (MAC) control element configuration, or a report configuration.

Aspect 30: The method of any of Aspects 22 to 29, wherein the report of the beam information is received in a channel state information reference signal resource, allocated for AN precoding, that is precoded with AN.

Aspect 31: The method of any of Aspects 22 to 30, wherein the beam information includes information identifying one or more analog beams, associated with one or more synchronization signal blocks, associated with less than a threshold channel metric.

Aspect 32: The method of any of Aspects 22 to 31, wherein a channel state information reference signal resource associated with reporting the beam information is quasi-co-located with a beam reported in the beam information.

Aspect 33: The method of any of Aspects 22 to 32, further comprising: transmitting a triggering message that indicates how to report the beam information; and wherein receiving the report of the beam information comprises: receiving, based on the triggering message, the report of the beam information in at least one of a radio resource control message, a medium access control control element, or downlink control information.

Aspect 34: The method of any of Aspects 22 to 33, wherein the one or more precoded AN signals are associated with AN generated based on a secret key.

Aspect 35: The method of any of Aspects 22 to 34, wherein the one or more precoded AN signals are associated with AN generated based on at least one of: a Gaussian signal, a quadrature amplitude modulation signal, an on-off keying signal, an amplitude-shift keying signal, a phase shift keying signal, a pulse-position modulation signal, a Bernoulli signal, or an exponential signal.

Aspect 36: The method of any of Aspects 22 to 35, wherein the one or more processors are further configured to: precode the one or more precoded AN signals based on a secret key available to the network node.

Aspect 37: The method of any of Aspects 22 to 36, wherein AN associated with the one or more precoded AN signals is removable based on a secret key associated with an AN sequence of the one or more precoded AN signals and a demodulation reference signal (DMRS) associated with the one or more precoded AN signals, and wherein the one or more data signals are decodable after removal of the AN using the secret key.

Aspect 38: The method of any of Aspects 22 to 37, further comprising transmitting a demodulation reference signal (DMRS) associated with the one or more precoded AN signals, and wherein the one or more data signals are decodable based on the DMRS.

Aspect 39: An apparatus for wireless communication at a device, comprising a processor; memory coupled with the processor; and instructions stored in the memory and executable by the processor to cause the apparatus to perform the method of one or more of Aspects 1-21.

Aspect 40: A device for wireless communication, comprising a memory and one or more processors coupled to the memory, the one or more processors configured to perform the method of one or more of Aspects 1-21.

Aspect 41: An apparatus for wireless communication, comprising at least one means for performing the method of one or more of Aspects 1-21.

Aspect 42: A non-transitory computer-readable medium storing code for wireless communication, the code comprising instructions executable by a processor to perform the method of one or more of Aspects 1-21.

Aspect 43: A non-transitory computer-readable medium storing a set of instructions for wireless communication, the set of instructions comprising one or more instructions that, when executed by one or more processors of a device, cause the device to perform the method of one or more of Aspects 1-21.

Aspect 44: An apparatus for wireless communication at a device, comprising a processor; memory coupled with the processor; and instructions stored in the memory and executable by the processor to cause the apparatus to perform the method of one or more of Aspects 22-38.

Aspect 45: A device for wireless communication, comprising a memory and one or more processors coupled to the memory, the one or more processors configured to perform the method of one or more of Aspects 22-38.

Aspect 46: An apparatus for wireless communication, comprising at least one means for performing the method of one or more of Aspects 22-38.

Aspect 47: A non-transitory computer-readable medium storing code for wireless communication, the code comprising instructions executable by a processor to perform the method of one or more of Aspects 22-38.

Aspect 48: A non-transitory computer-readable medium storing a set of instructions for wireless communication, the set of instructions comprising one or more instructions that, when executed by one or more processors of a device, cause the device to perform the method of one or more of Aspects 22-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the term "or" is intended to be inclusive when used in a series and may be used interchangeably with "and/or," unless explicitly stated otherwise (e.g., if used in combination with "either" or "only one of").

What is claimed is:

1. A network node for wireless communication, comprising:
 a memory; and
 one or more processors coupled to the memory, wherein the one or more processors are configured to:
  receive an unprecoded reference signal;
  report, based on the unprecoded reference signal, beam information associated with artificial noise (AN); and
  receive one or more data signals protected by one or more precoded AN signals, wherein the one or more precoded AN signals are based on the beam information.

2. The network node of claim 1, wherein the one or more processors are configured to:
 decode the one or more data signals.

3. The network node of claim 1, wherein, to decode the one or more data signals, the one or more processors are configured to decode the one or more data signals without removing AN associated with the one or more precoded AN signals.

4. The network node of claim 1, wherein the one or more processors are configured to:
 remove, using a secret key associated with an AN sequence of the one or more precoded AN signals, AN associated with the one or more precoded AN signals; and
 decode the one or more data signals after removal of the AN using the secret key.

5. The network node of claim 1,
 wherein the one or more precoded AN signals are associated with codebook or non-codebook based precoding; and
 wherein the one or more processors, to report the beam information, are configured to:
  report at least one of:
   information identifying a set of beams with less than a threshold reference signal received power, or
   a channel quality indicator for the set of beams.

6. The network node of claim 5, wherein a rank of AN precoding of the one or more precoded AN signals is based on a rank indicator associated with the beam information.

7. The network node of claim 1,
 wherein the one or more data signals are associated with a channel state information reference signal precoded based on a plurality of resources, and
 wherein the one or more processors, to report the beam information, are configured to:
  report information identifying one or more resource indices of one or more beams with less than a threshold signal to interference and noise ratio.

8. The network node of claim 1, wherein AN precoding of the one or more precoded AN signals is based on a sounding reference signal.

9. The network node of claim 1, wherein a quantity of beams reported in the beam information is based on at least one of:
 a radio resource control configuration,
 a medium access control (MAC) control element configuration, or
 a report configuration.

10. The network node of claim 1, wherein the beam information is reported in a channel state information reference signal resource, allocated for AN precoding, that is precoded with AN.

11. The network node of claim 1,
 wherein the beam information includes information identifying one or more analog beams associated with a channel metric that is less than a threshold, and
 wherein the one or more analog beams are associated with one or more synchronization signal blocks.

12. The network node of claim 1, wherein a channel state information reference signal resource associated with reporting the beam information is quasi-co-located with a beam reported in the beam information.

13. The network node of claim 1,
 wherein the one or more processors are configured to receive a triggering message that indicates how to report the beam information; and
 wherein the one or more processors, to report the beam information, are configured to:
  report, based on the triggering message, the beam information in at least one of a radio resource control message, a medium access control control element, or downlink control information.

14. The network node of claim 1, wherein the one or more precoded AN signals are associated with AN generated based on a secret key available to the network node.

15. The network node of claim 1, wherein the one or more precoded AN signals are associated with AN generated based on at least one of:
 a Gaussian signal,
 a quadrature amplitude modulation signal,
 an on-off keying signal,
 an amplitude-shift keying signal,
 a phase shift keying signal,
 a pulse-position modulation signal,
 a Bernoulli signal, or
 an exponential signal.

16. The network node of claim 1, wherein the one or more processors are configured to:
 decode the one or more data signals based on a secret key available to a source of the one or more data signals.

17. The network node of claim 1, wherein the one or more processors are configured to:
 decode the one or more data signals based on whether there is one AN source or multiple AN sources.

18. The network node of claim 1, wherein the one or more processors are configured to:
 decode the one or more data signals based on at least one of a secret key or a reported beam.

19. The network node of claim 1, wherein the one or more processors are configured to:
 remove AN associated with the one or more precoded AN signals based on a secret key associated with an AN sequence of the one or more precoded AN signals and a demodulation reference signal (DMRS) associated with the one or more precoded AN signals; and
 decode the one or more data signals after removal of the AN.

20. The network node of claim 1, wherein the one or more processors are configured to:
 decode the one or more data signals based on a secret key available to a source of the one or more data signals and a demodulation reference signal (DMRS) associated with the one or more precoded AN signals.

21. The network node of claim 1, wherein the one or more processors are configured to:

decode the one or more data signals based on a demodulation reference signal (DMRS) associated with the one or more precoded AN signals.

22. A network node for wireless communication, comprising:

a memory; and one or more processors coupled to the memory, wherein the one or more processors are configured to:

transmit an unprecoded reference signal;

receive, based on the unprecoded reference signal, a report of beam information associated with artificial noise (AN); and transmit one or more data signals protected by one or more precoded AN signals, wherein the one or more precoded AN signals are based on the beam information.

23. The network node of claim 22, wherein the one or more data signals are decodable without removing AN associated with the one or more precoded AN signals.

24. The network node of claim 22, wherein AN associated with the one or more precoded AN signals is removable using a secret key associated with an AN sequence of the one or more precoded AN signals, and wherein the one or more data signals are decodable after removal of the AN using the secret key.

25. The network node of claim 22, wherein the one or more precoded AN signals are associated with codebook or non-codebook based precoding; and wherein the one or more processors, to receive the report of the beam information, are configured to:

receive at least one of:

information identifying a set of beams with less than a threshold reference signal received power, or a channel quality indicator for the set of beams.

26. The network node of claim 25, wherein a rank of the AN precoding of the one or more precoded AN signals is based on a rank indicator associated with the beam information.

27. The network node of claim 22, wherein the one or more data signals are associated with a channel state information reference signal precoded based on a plurality of resources, and wherein the one or more processors, to receive the report of the beam information, are configured to:

receive information identifying one or more resource indices of one or more beams with less than a threshold signal to interference and noise ratio.

28. The network node of claim 22, wherein the AN precoding of the one or more precoded AN signals is based on a sounding reference signal.

29. A method of wireless communication performed by a network node, comprising:

receiving an unprecoded reference signal;

reporting, based on the unprecoded reference signal, beam information associated with artificial noise (AN); and receiving one or more data signals protected by one or more precoded AN signals, wherein the one or more precoded AN signals are based on the beam information.

30. A method of wireless communication performed by a network node, comprising:

transmitting an unprecoded reference signal;

receiving, based on the unprecoded reference signal, a report of beam information associated with artificial noise (AN); and transmitting one or more data signals protected by one or more precoded AN signals, wherein the one or more precoded AN signals are based on the beam information.

* * * * *